(12) United States Patent
Goergen et al.

(10) Patent No.: US 12,544,684 B2
(45) Date of Patent: Feb. 10, 2026

(54) SYSTEMS AND METHODS FOR PROJECTION MAPPING FOR AMUSEMENT PARK ATTRACTION SYSTEM

(71) Applicant: Universal City Studios LLC, Universal City, CA (US)

(72) Inventors: Patrick John Goergen, Orlando, FL (US); Howard Bruce Mall, Jr., Winter Springs, FL (US); Paige Lynette Reiter, Utica, MI (US); Gregory Paul Habiak, Bryn Mawr, PA (US)

(73) Assignee: Universal City Studios LLC, Universal City, CA (US)

( * ) Notice: Subject to any disclaimer, the term of this patent is extended or adjusted under 35 U.S.C. 154(b) by 625 days.

(21) Appl. No.: 18/056,154

(22) Filed: Nov. 16, 2022

(65) Prior Publication Data

US 2024/0157264 A1 May 16, 2024

(51) Int. Cl.
*A63J 5/02* (2006.01)
*G02B 26/08* (2006.01)
*G03B 21/28* (2006.01)
*A63G 31/02* (2006.01)

(52) U.S. Cl.
CPC ............ *A63J 5/02* (2013.01); *G02B 26/0816* (2013.01); *G03B 21/28* (2013.01); *A63G 31/02* (2013.01)

(58) Field of Classification Search
CPC ....... A63J 5/02; G02B 26/0816; G03B 21/28; G03B 21/10; A63G 31/02; A63G 31/00; G06F 3/011; G06F 3/0346; H04N 9/3179; H04N 9/3194
See application file for complete search history.

(56) References Cited

U.S. PATENT DOCUMENTS

| | | |
|---|---|---|
| 3,976,837 A | 8/1976 | Lang |
| 4,943,851 A | 7/1990 | Lang et al. |
| 6,590,606 B1 | 7/2003 | Hiller et al. |
| 6,950,153 B2 | 9/2005 | Lane |
| 8,432,436 B2 | 4/2013 | Debevec et al. |
| 2002/0122161 A1 | 9/2002 | Nishida et al. |
| 2003/0025649 A1* | 2/2003 | Wynne Willson ... H04N 9/3185 348/E5.143 |
| 2009/0079945 A1 | 3/2009 | Klosowiak et al. |
| 2009/0303447 A1* | 12/2009 | Turner .................. G03B 21/28 353/50 |
| 2011/0013097 A1 | 1/2011 | Freeman et al. |
| 2012/0223885 A1 | 9/2012 | Perez |
| 2016/0131761 A1* | 5/2016 | Yates ..................... G01S 7/481 356/3.11 |

(Continued)

OTHER PUBLICATIONS

PCT/US2023/079839 International Search Report and Written Opinion mailed Mar. 18, 2024.

(Continued)

*Primary Examiner* — Bryan Earles
(74) *Attorney, Agent, or Firm* — Fletcher Yoder P.C.

(57) ABSTRACT

An attraction system includes a projector configured to project imagery and a rotating assembly including a mirror, wherein the rotating assembly is positioned with respect to the projector such that the imagery projected by the projector deflects off the mirror and onto a projection surface, and the rotating assembly is configured to rotate the mirror to adjust a positioning of the imagery deflected onto the projection surface via the mirror.

20 Claims, 6 Drawing Sheets

(56) References Cited

U.S. PATENT DOCUMENTS

2017/0006267 A1* 1/2017 Lim .................... H04N 9/3188
2017/0264873 A1 9/2017 Muramatsu
2020/0195900 A1 6/2020 Sodhi et al.
2021/0286250 A1 9/2021 Abe et al.

OTHER PUBLICATIONS

SimuTech Group, "Construction of Canada's Largest VR CAVE," Jun. 18, 2019, pp. 1-3, YouTube, https://www.youtube.com/watch?v=MDx3H8jobO4.
IdahoNationalLab, "Computer Assisted Virtual Environment—CAVE," Jan. 14, 2014, pp. 1-3, YouTube, https://www.youtube.com/watch?v=M16mz8Pc_OM.
The 360 Guy, "What's the best 360 camera for Google Street View photography?," Jan. 13, 2022, pp. 1-13, https://www.threesixtycameras.com/best-360-camera-for-google-street-view/.
Will Nicholls, "How Ultra High Speed Cameras Shoot Up to 25,000,000 FPS," Nov. 13, 2017, pp. 1-9, PetaPixel, https://petapixel.com/2017/11/13/ultra-high-speed-cameras-shoot-25000000-fps/.

* cited by examiner

SYSTEMS AND METHODS FOR PROJECTION MAPPING FOR AMUSEMENT PARK ATTRACTION SYSTEM

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, special effects can be used to help immerse guests in the experience of a ride or attraction. Immersive environments may include displays that present media, three-dimensional (3D) props and set pieces, and/or robotic or mechanical elements. In addition, the immersive environments may include audio effects, smoke effects, and/or motion effects. Thus, immersive environments may include a combination of dynamic and static elements. However, implementation and operation of special effects may be complex. For example, it may be difficult to operate certain elements of the special effects in a desirable manner to create the immersive environment. With the increasing sophistication and complexity of modern ride attractions, and the corresponding increase in expectations among guests, improved and more creative attractions are desirable, including ride attractions having special effects to provide the immersive environment.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an attraction system comprises a projector configured to project imagery and a rotating assembly comprising a mirror, wherein the rotating assembly is positioned with respect to the projector such that the imagery projected by the projector deflects off the mirror and onto a projection surface, and the rotating assembly is configured to rotate the mirror to adjust a positioning of the imagery deflected onto the projection surface via the mirror.

In an embodiment, an attraction system comprises a projector configured to project imagery, a rotating assembly comprising a mirror, wherein the mirror is configured to receive the imagery projected by the projector and to deflect the imagery onto a surface, and the rotating assembly is configured to rotate the mirror to adjust deflection of the imagery off the mirror and onto the surface, and a media controller communicatively coupled to the projector and to the rotating assembly, wherein the media controller is configured to determine an operating parameter associated with the surface and instruct the projector to project imagery onto the first surface based on the operating parameter.

In an embodiment, a non-transitory computer-readable medium comprises instructions that, when executed by processing circuitry, are configured to cause the processing circuitry to perform operations comprising determining an operating parameter associated with a wall of an amusement park system, wherein the operating parameter indicates a characteristic of the wall, a configuration of a rotating assembly, guest activity, or any combination thereof, generating image data based on the operating parameter, transmitting the image data to a projector of the amusement park system to cause the projector to output imagery via the image data onto a mirror for deflection off the mirror and onto the wall, and instructing the rotation of the mirror to adjust the deflection of the imagery off the mirror and onto the wall.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
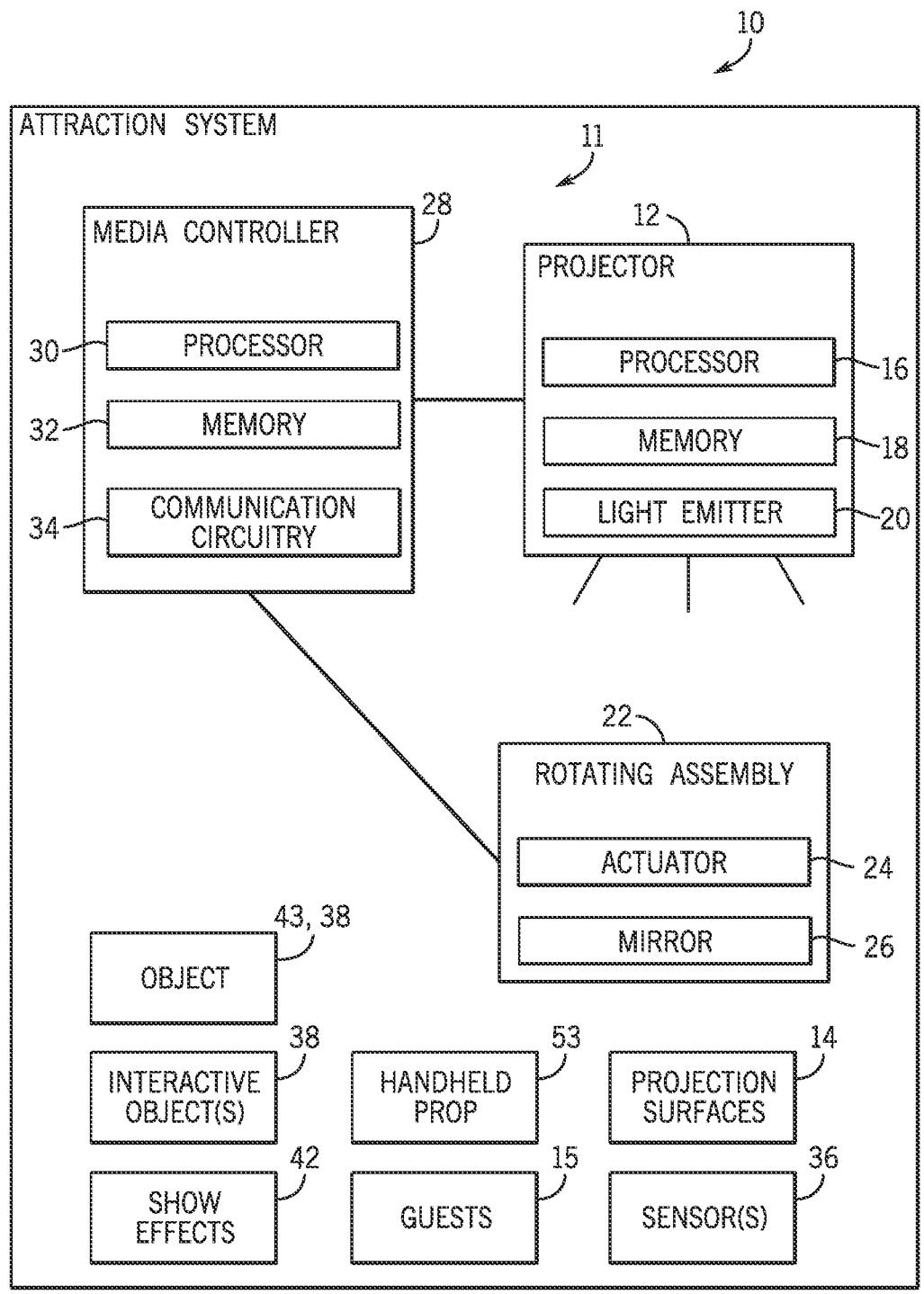
FIG. 1 is a block diagram of an attraction system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to a system of an amusement park. The amusement park may include various attraction systems, such as a ride (e.g., a roller coaster, a water ride, a drop tower), or an immersive experience (e.g., an interactive environment), with features that may entertain guests. For example, an attraction system may provide a virtual environment for the guests in the attraction system, such as guests on a ride vehicle or otherwise navigating the attraction system. The virtual environment may entertain guests by providing a realistic and/or immersive atmosphere. For instance, the virtual environment may be interactive and produce certain effects based on detected actions or interactions of the guests. For example, in response to determining that a guest waves their hand, imagery of a character waving back may be output. Thus, the attraction system may provide show effects that appear to react to actions taken by guests.

To provide a desirable level of immersion for guests in the attraction system, the virtual environment may surround the guests (e.g., virtual environment may span 360 degrees inside a room). As an example, imagery may be projected onto one or more walls and/or surfaces of an enclosure (e.g., a room) such that guests inside the enclosure may be essentially surrounded by the projected imagery. However, creating a virtual environment that sufficiently surrounds a guest to achieve desired levels of immersion may be difficult and/or complex. This difficulty and complexity can result in exorbitant expenses. For example, providing projectors for each of numerous surfaces around a guest can be expensive, especially when trying to surround the guest with a virtual environment. Accordingly, the virtual environments provided by some existing attraction systems may only employ limited surface projection to avoid difficulties and inefficiencies with traditional techniques. Thus, such attraction systems may not provide a desirable effect or amount of entertainment for guests.

Accordingly, embodiments of the present disclosure are directed to a projector assembly that may be cost effective and operates to efficiently provide a virtual environment (e.g., an interactive virtual environment) that can surround guests within an enclosure. The projector assembly includes a projector, which may be positioned in the enclosure. The projector may include a light source that may output imagery (e.g., via a light beam). The projector assembly may also include a mirror positioned with respect to the projector to receive the imagery output by the projector and deflect the imagery onto the various projection surfaces (e.g., walls, props, set pieces, guests). For example, the projector and the mirror may be oriented at an angle relative to one another to enable the mirror to deflect the imagery toward a target location within the enclosure. Additionally, the mirror may be rotated to change a direction in which the imagery output by the projector is deflected. As an example, the mirror may continually rotate about a rotational axis to deflect various imagery for projection mapping onto different parts of the enclosure and surround the guests with such imagery. In this manner, the imagery may establish a virtual environment surrounding the guests (e.g., surrounding the guests by displaying on all lateral interior sides of a room or enclosure in which the guests are positioned). Indeed, the projector may output different imagery (e.g., a sequence of images) at a particular frame rate that provides a virtual environment with a more realistic appearance, such as via a panoramic scene having elements that appear to be moving. To this end, the rotation and output of imagery may be synchronized with one another to provide a desirable virtual environment. In an embodiment, the projector assembly may include a sensor that may identify various parameters, such as an action performed by a guest, a position of a guest and/or an object in the enclosure, and/or a type of object present in the enclosure, and the imagery may be output based on an identified parameter. As such, the virtual environment provided by the projector assembly may appear more realistic, immersive, and/or personalized. Further, by employing the rotating mirror, this may be done efficiently, even with a single projector.

Usage of the projector and rotating mirror may enable projection mapping of imagery that surrounds guests without having to use an excessive quantity (e.g., more than one) of projectors, such as projectors that may be dedicated to output imagery to a particular location in the enclosure. Thus, the projector assembly may provide a virtual environment at reduced costs and/or reduced complexity that may be incurred with implementation and/or operation of multiple projectors. Moreover, the projector assembly may be implemented without affecting (e.g., restricting) movement of the guests within the enclosure. For instance, the guests may freely move in the enclosure without affecting the virtual environment being provided, and the projector assembly may therefore maintain a desirable appearance of the virtual environment for the guests. As such, the projector assembly may enable desirable operation of the attraction system to entertain the guests.

With the preceding in mind, FIG. 1 is a block diagram of an attraction system 10, in accordance with an aspect of the present disclosure. The attraction system 10 may include a ride (e.g., a roller coaster), a navigation area (e.g., a walkway) a performance show, and so forth where guests 15 may be located. The attraction system 10 may entertain the guests 15 by immersing the guests 15 within a virtual environment. For example, the attraction system 10 may include a projector assembly 11 having a projector 12 configured to output imagery, such as one or more images, onto projection surfaces 14 (e.g., walls, wall portion, props, set pieces, guests 15) within an enclosure of the attraction system 10, to projection map the imagery onto the projection surfaces 14. The imagery may include various digital content or objects that provides the virtual environment. The guests 15 may view the projection mapped imagery to be immersed within the virtual environment established via the projector 12. As an example, the imagery provided by the projector 12 may include underwater flora and fauna, thereby providing a virtual underwater environment to entertain the guests 15. In an embodiment, the guests 15 may be positioned within a ride vehicle, which may navigate through the attraction system 10 and carry the guests 15 to different locations within the attraction system 10. In an additional or alternative embodiment, the guests 15 may be navigating an area in the attraction system 10 without a ride vehicle.

The projector 12 may include a processor 16 (e.g., processing circuitry), a memory 18, and a light emitter 20. The light emitter 20 may emit the imagery (e.g., images for projection) via a beam of light. The light emitter 20 may also include a lens, which may focus the beam of light. The memory 18 may include volatile memory, such as random access memory (RAM), and/or non-volatile memory, such as read-only memory (ROM), optical drives, hard disc drives, solid-state drives, or any other non-transitory computer-readable medium that includes instructions to operate the projector 12. The processor 16 may be configured to execute such instructions. For example, the processor 16 may include one or more application specific integrated circuits (ASICs), one or more field programmable gate arrays (FPGAs), one or more general purpose processors, or any combination thereof.

The projector assembly 11 may also include a rotating assembly 22, which may include an actuator 24 and a mirror 26. The projector 12 (e.g., the light emitter 20) may output imagery onto the mirror 26 of the rotating assembly 22, and the mirror 26 may deflect the imagery toward the projection surfaces 14. The actuator 24 may cause relative rotation between the mirror 26 and the projector 12 (e.g., and between the mirror 26 and the projection surfaces 14). For example, the actuator 24 may include a motor (e.g., an electrical motor), a rotary actuator, or any other component configured to rotate the mirror 26 relative to the projector 12. A single rotational cycle of the rotating assembly 22 (e.g., in which the rotating assembly 22 completes a 360 degree rotation) may cause the imagery output by the projector 12 to be projection mapped onto multiple different projection surfaces 14. For example, positioning of the mirror 26 at the beginning of the rotational cycle (e.g., the mirror 26 is oriented at 0 degrees relative to a reference axis) may cause the imagery to be projected onto a first projection surface 14 at a first side (e.g., onto a wall at a geographical east side) of the attraction system 10. Rotation of the mirror 26 a quarter of the way through the rotational cycle may cause the imagery to be projected onto a second projection surface 14 at a second side (e.g., a wall at a geographical north side) of the attraction system 10. As such, the projector 12 may cause imagery to be projection mapped onto projection surfaces 14 at different sides of the attraction system 10 via the rotating assembly 22.

In an embodiment, the actuator 24 may cause the mirror 26 to rotate at a particular rotational velocity to provide an appearance that each projection surface 14 simultaneously receives the imagery output by the projector 12. That is, the imagery output by the projector 12 may appear to be a single, continuous scene, such as a scene surrounding the guests 15, thereby providing a realistic, virtual environment for the guests 15. For example, the actuator 24 may rotate the mirror 26 at above a threshold quantity of rotational cycles per second (e.g., threshold rotational speed), such as 10 rotational cycles per second, 50 rotational cycles per second, 100 rotational cycles per second, or more. As such, a single projector 12 may establish the virtual environment of the attraction system 10 via the rotating assembly 22.

The rotating assembly 22 and/or the projector 12 may be communicatively coupled to a media controller 28 (e.g., an automation controller, a programmable controller, an electronic controller, control circuitry), which may be a part of or communicatively coupled to the projector assembly 11. The media controller 28 may be configured to operate the rotating assembly 22 (e.g., to rotate the mirror 26) as well as to operate the projector 12 (e.g., to provide image data used by the projector 12 to output imagery). The media controller 28 may operate the projector 12 and/or the rotating assembly 22 to projection map different imagery onto different projection surfaces 14 (e.g., projection surfaces 14 at different locations of the attraction system 10). Thus, different virtual objects may be presented to provide a more realistic and/or immersive virtual environment. For example, imagery of a rain forest may be projected onto a projection surface at a first location (e.g., a first side), and imagery of a beach may be projected onto a projection surfaces 14 at a second location (e.g., a second side, opposite the first side). Between the first location and the second location, the imagery projected by the projector 12 may provide an appearance of a transition between the rain forest and the beach environment, thereby providing a more captivating virtual environment to entertain the guests 15.

To this end, the media controller 28 may operate the projector assembly 11 to cause a desirable image to be projected onto a desirable location of the attraction system 10 (e.g., onto a particular projection surface 14). For instance, the media controller 28 may coordinate operation of the projector 12 with the operation of the rotating assembly 22 to cause a target image to be output at a target orientation of the mirror 26 relative to the projector 12 (e.g., a target angle of the mirror 26 with respect to the reference axis) to ensure that the target imagery is projection mapped as desired onto the proper projection surfaces 14. By way of example, the media controller 28 may transmit particular image data to the projector 12 to cause the projector 12 to output the target imagery, and the media controller 28 may concurrently instruct the rotating assembly 22 to position the mirror 26 at the target orientation while the projector 12 outputs the target imagery. In this manner, the media controller 28 may synchronize the output imagery with the corresponding projection surfaces 14 to present the virtual environment (e.g., the rain forest environment at the first side, the beach environment at the second side, and the transition imagery in between) as desired.

The media controller 28 may also include a processor 30 (e.g., processing circuitry) and/or a memory 32 to operate the projector 12 and/or the rotating assembly 22. The processor 30 and the memory 32 may have similar features as that described above with respect to the processor 16 and/or the memory 18, respectively, of the projector 12. The media controller 28 may also include communication circuitry 34 to communicatively couple the media controller 28 to the projector 12 and/or to the rotating assembly 22. The communication circuitry 34 may include a receiver, a transmitter, and/or any other suitable communications device to enable the media controller 28 to communicate over wired and/or wireless communication paths (e.g., Bluetooth, Wi-Fi).

The media controller 28 may also be communicatively coupled to one or more sensors 36 and/or one or more interactive objects 38 (e.g., a mobile device, an animated figure, a decoration) of the attraction system 10 via the communication circuitry 34. For example, the media controller 28 may receive data from the one or more sensors 36 and/or signals from the one or more interactive objects 38 via the communication circuitry 34. The media controller 28 may operate the projector 12 and/or the rotating assembly 22 based on the received data and/or the signals.

In an embodiment, the one or more sensors 36 may detect parameters associated with the guests 15 in the attraction system 10, such as movement of the guests 15 and movement of props (e.g., one or more interactive objects 38) that may be possessed or otherwise controlled or interactive with by the guests 15. Based on the parameters indicated by the data received from the one or more sensors 36 via the communication circuitry 34, the media controller 28 may update the image data transmitted to the projector 12 to change the imagery output by the projector 12. For example, in response to receipt of data that indicates that a guest 15 has turned towards a particular projection surface 14 of the attraction system 10, the media controller 28 may adjust the image data transmitted to the projector 12 to cause the projector 12 to output imagery that presents a virtual character on the projection surface 14 that the guest 15 is facing.

Additionally, or alternatively, the media controller 28 may receive signals via the communication circuitry 34 from the one or more interactive objects 38, which may include one or more handheld props 53 held by the guests 15 and/or objects distributed within the attraction system 10. In an embodiment, the attraction system 10 includes an interactive virtual environment where the guests 15 may use one or more handheld props 53 (e.g., a pointer) that emit a signal (e.g., an infrared light). Another object 43 (e.g., a physical object, a virtual object, a set piece), such as an animated figure, of the attraction system 10 may receive the signal emitted by one or more handheld props 53. Upon receiving the signal emitted by the one or more handheld props 53, the object 43 may provide an indication to the media controller 28 regarding the received signal, and the media controller 28 may transmit certain image data to the projector 12 in response to cause the projector 12 to output imagery. For example, the imagery being output by the projector 12 may provide an appearance of successful/unsuccessful targeting by a guest 15 with their one or more handheld props 53. Specifically, for example, an interaction may result in the projector 12 generating imagery of a crack forming in a set piece based on successful targeting with a virtual projectile. In an additional or alternative embodiment, one or more interactive objects 38 may include a user interface (e.g., a push button, a joystick, a touchscreen, a dial, a lever, a trackpad) with which a guest 15 may interact. An interaction between a guest 15 and the one or more interactive objects 38 may cause the one or more interactive objects 38 to output a signal to the media controller 28, and the media controller 28 may transmit image data to the projector 12 in response to receipt of the signal. For example, the one or more interactive objects 38 may include a prop representative of a fireplace, and an interaction between the one or more interactive objects 38 and a guest 15 may cause the media controller 28 to transmit image data that causes the projector 12 to output imagery providing an appearance of fire.

The attraction system 10 may further include other one or more show effects 42, such as visual effects (e.g., light), audio effects (e.g., sound), smoke effects, and the like, that may further enhance the experience of the guests 15. The media controller 28 may be communicatively coupled to various components and devices (e.g., lighting, speakers, fluid output devices) via the communication circuitry 34 and may activate the one or more show effects 42 in response to the data received from the one or more sensors 36 and/or the signals received from the one or more interactive objects 38. The one or more show effects 42 may complement or supplement the imagery output by the projector 12. For example, in response to determining that a guest 15 successfully targets an object in the attraction system 10 via their handheld prop, the media controller 28 may cause a sound effect to be emitted. Thus, operation of the projector 12 and the one or more show effects 42 may cooperatively entertain the guests 15.

Figure 2:
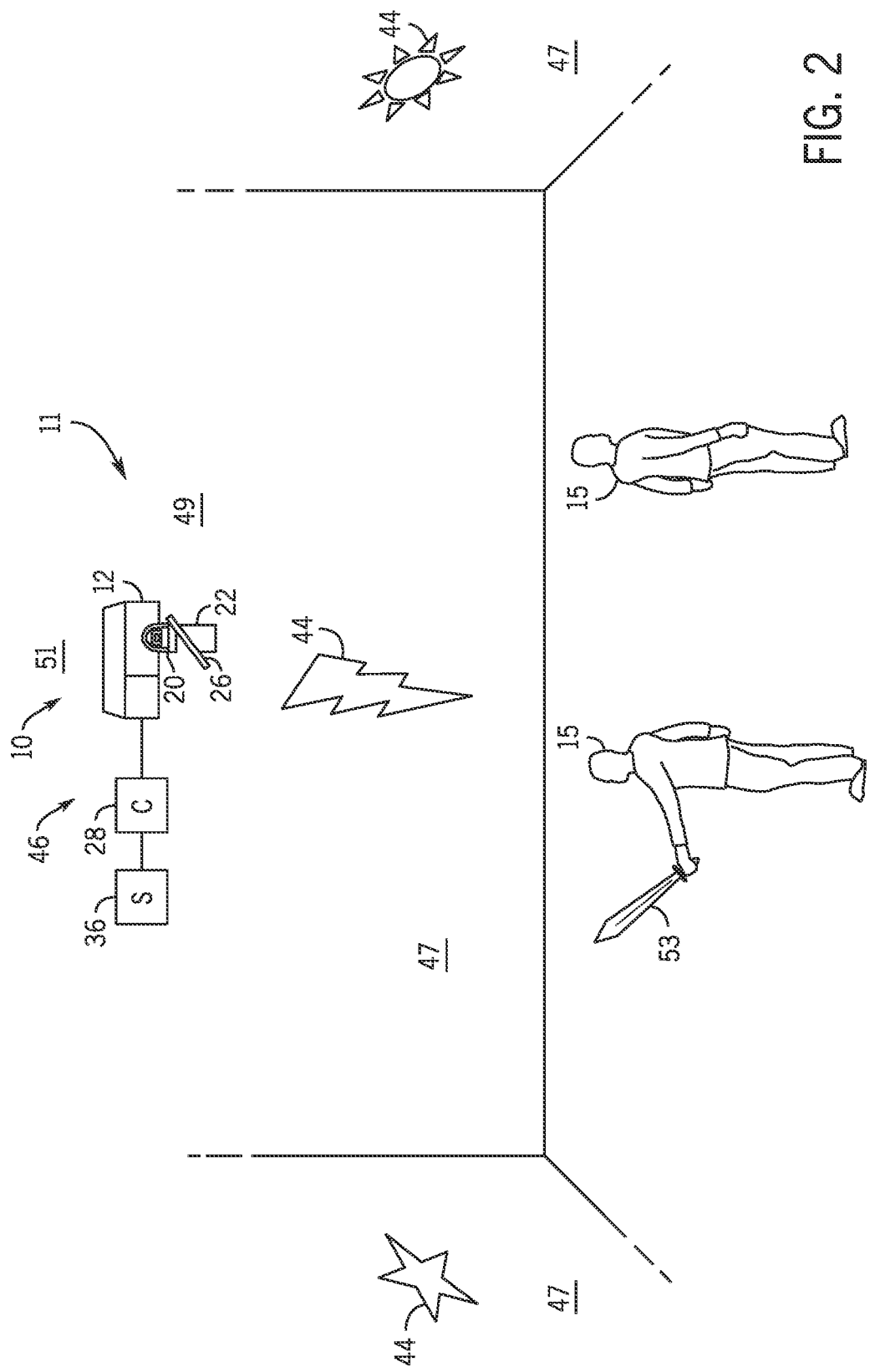
FIG. 2 is a perspective view of an embodiment of an attraction system having a projector assembly configured to projection map imagery onto a projection surface of the attraction system, in accordance with an aspect of the present disclosure.

FIG. 2 is a perspective view of an embodiment of a portion of an enclosure 46 (e.g., a room) of the attraction system 10, in accordance with an aspect of the present disclosure. The enclosure 46 may include one or more walls 47 (e.g., side walls, lateral walls) with imagery 44 projection mapped thereto by the projector 12. In the illustrated embodiment, the enclosure 46 is rectangularly shaped (e.g., with four walls). However, the enclosure 46 may have any other suitable shape, such as a circular shape, a triangular shape, a hexagonal shape, an irregular shape, and so forth, in an additional or alternative embodiment as defined by the one or more walls 47. The projector assembly 11 may be positioned within an interior 49 of the enclosure 46 defined by the one or more walls 47. As illustrated, the projector 12 is positioned approximately in the center of the enclosure 46 (e.g., equidistant from the opposite walls 47) and may project imagery outwardly from the interior 49 onto the one or more walls 47. However, the projector 12 may be positioned at any suitable location at the interior 49, such as at an offset from the center.

The imagery 44 output by the projector 12 and projection mapped onto the one or more walls 47 may provide a virtual environment for the guests 15 in the attraction system 10. As an example, the guests 15 positioned within the interior 49 may view the imagery 44, which may form a cohesive scene to establish the virtual environment. For instance, the projector assembly 11 may operate to provide an appearance that imagery is simultaneously projected onto each wall 47 as desired. Indeed, the media controller 28 may instruct the projector 12 and/or the rotating assembly 22 to projection map the imagery 44 onto any combination of the walls 47 (e.g., onto all of the walls 47, onto a subset of the walls 47). In an embodiment, the imagery 44 projected inside the enclosure 46 may include videos, animations, and/or still images. For example, the media controller 28 may operate the projector assembly 11 to adjust the imagery 44 being output to provide an appearance of moving and/or stationary virtual objects with respect to the one or more walls 47.

The projector assembly 11 may be positioned near a ceiling 51 to avoid guests 15, handheld props 53, and/or other physical elements from undesirably obstructing (e.g., blocking) a path (e.g., projection path) of travel of the imagery 44 from the projector assembly 11 (e.g., deflected off the mirror 26) onto the one or more walls 47. In other words, the projector assembly 11 may be positioned such that a path of travel from the mirror 26 to the one or more walls 47 may be generally clear. Thus, the positioning of the projector assembly 11 may improve the appearance of the imagery 44 projected onto the one or more walls 47.

As discussed, the guests 15 of the attraction system 10 may possess one or more handheld props 53 or any other object (e.g., a mobile device) that may be movable within the attraction system 10. In an embodiment, the media controller 28 may operate the projector 12 to output imagery based on a parameter associated with the one or more handheld props 53. For example, the one or more sensors 36 may transmit data indicative of movement (e.g., swinging) of the one or more handheld props 53 via a guest 15, and the media controller 28 may receive the data from the one or more sensors 36 and identify the movement via the data. The media controller 28 may cause the projector 12 to output imagery based on the movement. In an additional or an alternative embodiment, the one or more sensors 36 may transmit data indicative of movement and/or positioning (e.g., a gesture) of the guest 15, and the media controller 28 may cause the projector 12 to output imagery based on the movement of the guest 15. Additionally, the media controller 28 may determine, based on data from the one or more sensors 36 the type of objects present in the enclosure 46. For example, the media controller may distinguish a guest 15 with respect to a one or more handheld props 53.

Figure 3:
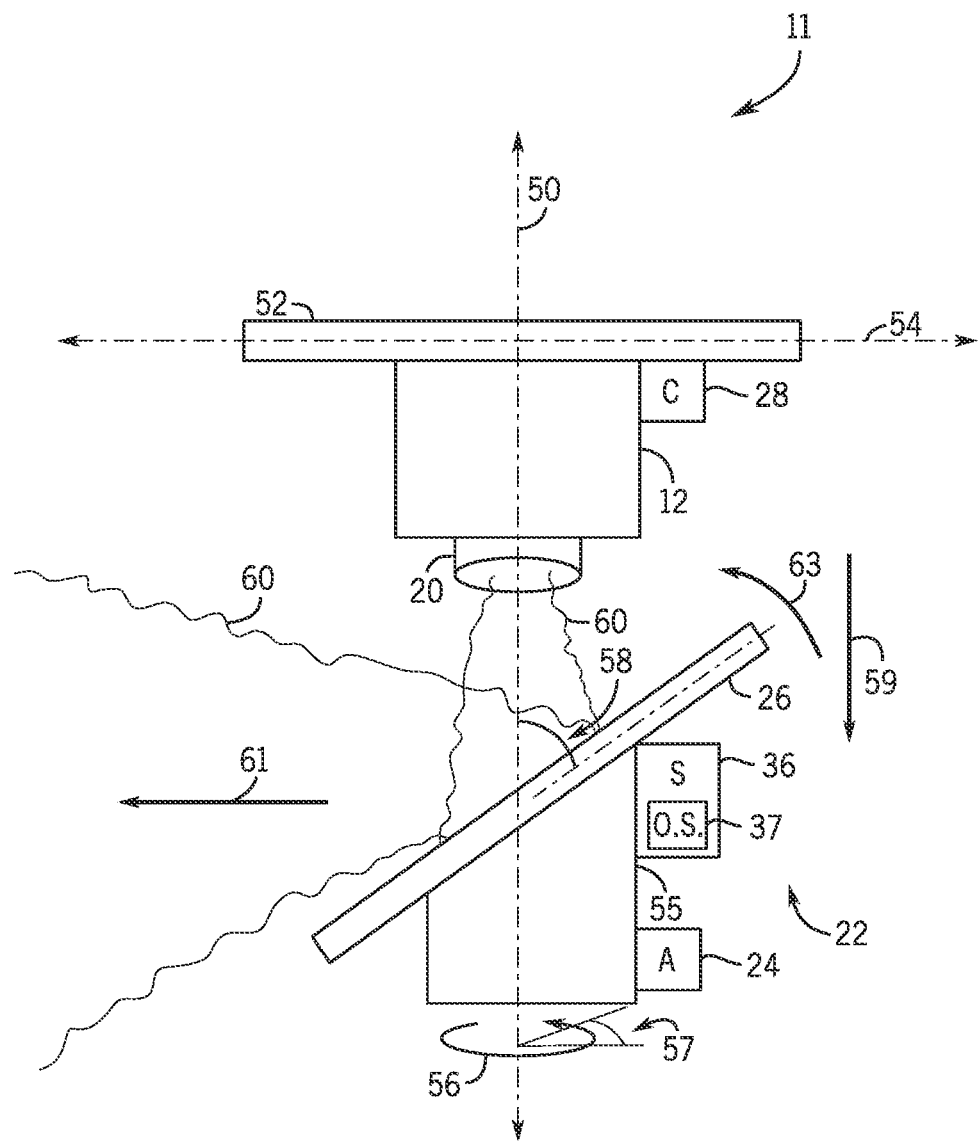
FIG. 3 is a schematic diagram of a projector assembly, in accordance with an aspect of the present disclosure.

FIG. 3 is a schematic diagram of the projector assembly 11, in accordance with an aspect of the present disclosure. The projector assembly 11 may include the projector 12 positioned with the light emitter 20 facing a first direction (e.g., a downward direction) along the vertical axis 50. The projector 12 may be attached to a base 52, which may be attached to a surface (e.g., of the ceiling 51 of FIG. 2) or to another component, thereby securing the projector 12 to the surface. The projector assembly 11 may include the rotating assembly 22 having the mirror 26. For example, the rotating assembly 22 may be positioned below the projector 12 along the vertical axis 50. The projector 12 may output a light beam 60 via the light emitter 20 in a projected direction 59 (e.g., along the vertical axis 50) onto the mirror 26 for deflection off the mirror 26.

The mirror 26 may be obliquely positioned at an angle 58 (e.g., a 0 degree angle, a 30 degree angle, a 45 degree angle, a 60 degree angle, a 90 degree angle, any suitable angle between 0 degrees and 90 degrees) relative the direction (e.g., the vertical axis 50) in which the light emitter 20 is oriented to cause the mirror 26 to deflect the light beam 60 in a deflected direction 61 based on the angle 58 (e.g., along a horizontal axis 54, or at any suitable angle relative to the horizontal axis 54, such as based on the angle 58 of the mirror 26) away from the projector 12, such as onto the wall 47 of FIG. 2, for output as imagery. For example, the deflected direction 61 may range from 0 to 90 degrees above or below the horizontal axis 54. Additionally, the rotating assembly 22 may rotate the mirror 26 about the vertical axis 50 in a first rotational direction 56. For example, the mirror 26 may be coupled, such as fixedly coupled, to a support 55 (e.g., a shaft). In an embodiment, the support 55 may be attached to a ceiling and/or to the projector 12 via a clear (e.g., light transmissive) support structure. Additionally, or alternatively, the support 55 may be attached to the ceiling and/or the projector 12 via a support structure that rotates at the same rate as the mirror as to avoid blocking the light beam 60 from the projector 12 that is deflected off the mirror 26. The actuator 24 may be configured to rotate the support 55 and therefore the mirror 26 to adjust a rotational angle 57 (e.g., rotational position) of the mirror 26 (e.g., an extent in which the mirror 26 is rotated about the vertical axis 50). Rotation of the mirror 26 about the vertical axis 50 may adjust the deflected direction 61 in which the light beam 60 is deflected. For instance, the mirror 26 may be rotated to cause the light beam 60 to be projected around the vertical axis 50, thereby surrounding the projector assembly 11 via imagery provided by the light beam 60. Although the illustrated mirror 26 is described as being rotated about the vertical axis 50, the mirror 26 may be rotated about any other suitable axis (e.g., an axis obliquely oriented with respect to the vertical axis 50) to adjust the deflected direction 61 of the light beam 60.

In one embodiment, the mirror 26 may be rotated about a second rotational direction 63 in addition to or as an alternative to the first rotational direction 56. Rotation of the mirror 26 in the second rotational direction 63 may adjust the angle 58 in which the mirror 26 is oriented relative to the light emitter 20 and/or relative to the vertical axis 50. Such rotation of the mirror 26 may adjust the deflected direction 61 to change a vertical position of the imagery on a projection surface. For example, decreasing the angle 58 may adjust the deflected direction 61 more downwardly to lower the imagery on the projection surface (e.g., toward the floor). Increasing the angle 58 may adjust the deflected direction 61 more upwardly to raise the imagery on the projection surface (e.g., toward the ceiling). In an embodiment, the angle 58 may be adjusted sinusoidally (e.g., oscillating between 10 degrees and 80 degrees). Such sinusoidal oscillation of the angle 58 may be used to project imagery onto a greater number of projection surfaces. For example, sinusoidal oscillation of the angle 58 at above a threshold angular speed may enable the imagery to appear to be simultaneously projection mapped onto the ceiling, floor, and/or side walls of the enclosure. In an embodiment, the mirror 26 may have various shapes and/or curvatures (e.g., convex, concave, flat) to deflect imagery with certain visual effects.

Moreover, in an embodiment, the mirror 26 may be moved in a linear direction. For instance, the actuator 24 may translate the mirror 26 along the vertical axis 50 and/or along the horizontal axis 54 to move the mirror 26 relative to the projector 12 and adjust the manner in which the light beam 60 is deflected off the mirror 26 (e.g., to adjust a position in which the imagery is projected onto a projection surface). Indeed, the mirror 26 may be moved in any suitable manner to adjust the output of the imagery.

Furthermore, the projector 12 may be moved (e.g., relative to the mirror 26). As an example, the projector 12 may be rotated (e.g., in the second rotational direction 63). As another example, the projector 12 may be translated (e.g., along the vertical axis 50, along the horizontal axis 54). For instance, the base 52 may include a rail that may enable translation of the projector 12 relative to the mirror 26. The media controller 28 may control movement of the projector 12 and/or of the mirror 26 to adjust output of imagery.

As described herein, the one or more sensors 36 may transmit various data, such as a positioning of the projector assembly 11 (e.g., of the mirror 26) and/or a layout of the attraction system, and the media controller 28 may operate the projector assembly 11 based on the received data. In the illustrated embodiment, one of the one or more sensors 36 is attached to the rotating assembly 22 and, therefore, it rotates with the mirror 26. That is, the one or more sensors 36 may be fixedly coupled to the mirror 26 and/or to the support 55. Thus, rotation of the mirror 26 and/or the support 55 about the vertical axis 50 may also drive corresponding rotation of the one or more sensors 36 about the vertical axis 50. As such, rotation of the one or more sensors 36 about the vertical axis 50 may enable the one or more sensors 36 to determine various parameters, such as parameters associated with different projection surfaces.

As an example, the one or more sensor 36 may include an accelerometer or a gyroscope that transmits data indicative of the movement of the mirror 26. The media controller 28 may determine the orientation of the mirror 26 based on such data, and the media controller 28 may determine the location (e.g., on a projection surface) onto which imagery may be projection mapped based on the orientation. The media controller 28 may transmit image data based on the location to cause the projector 12 to projection map target imagery onto the location via the image data. For instance, the data transmitted by the one or more sensors 36 may indicate the rotation of the one or more sensors 36 and therefore of the mirror 26 and/or of the support 55 about the vertical axis 50.

As another example, the one or more sensors 36 may include an optical sensor, such as a Light Detection and Ranging (LIDAR) sensor, a camera, and so forth. Such an optical sensor 37 may provide data indicative of a projection surface onto which the imagery may be projection mapped, such as an indication of a distance from the projector assembly 11 to a projection surface. For example, as further discussed herein, the media controller 28 may operate the projector assembly 11 to adjust an appearance of imagery on a projection surface based on a characteristic of the projection surface. The data transmitted by the optical sensor 37 may indicate such a characteristic of the projection surface, and the media controller 28 may transmit image data based on the characteristic to cause the projector 12 to output target imagery having a desirable appearance. For example, the characteristic of the projection surface may include the depth (e.g., distance from the projector assembly 11) of various facets of the projection surface. Thus, based on depth sensing, the image data may be properly mapped onto to the projection surface. The rotation of the optical sensor 37 as driven by rotation of the mirror 26 and/or of the support 55, may enable the optical sensor 37 to monitor characteristics of different projection surfaces to cause the media controller 28 to transmit image data for projection mapping of imagery onto the different projection surfaces via the projector 12. Indeed, the data transmitted by the optical sensor 37 may be used for a variety of purposes, including tracking of the guests 15, of the one or more interactive objects 38, and/or of the one or more walls.

Figure 4:
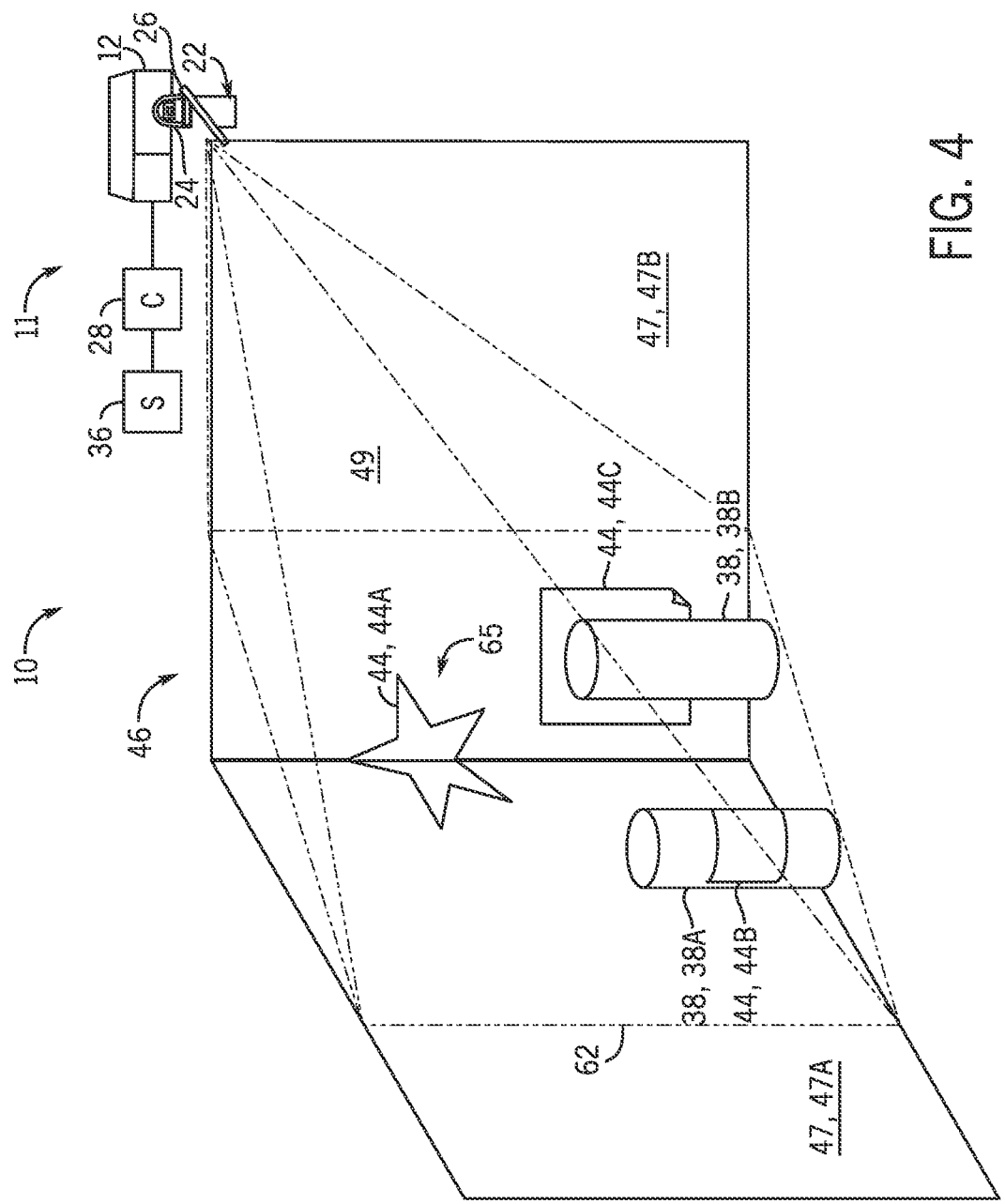
FIG. 4 is a perspective view of an attraction system having a projector assembly configured to projection map imagery onto a projection surface of the attraction system, in accordance with an aspect of the present disclosure.

As mentioned herein, the projector assembly 11 may produce a virtual environment inside the enclosure, such as a 360 degree virtual environment that surrounds guests 15. Indeed, imagery output by the projector 12 and rotation of the mirror 26 deflecting the imagery output by the projector 12 may projection map the imagery 44 to appear as a single continuous image/video/animation. For example, the projector 12 may output the imagery 44 as sequential media frames that are updated at a particular frequency. FIG. 4 is a perspective view of an embodiment of the attraction system 10 in which a single media frame 62 is projected by the projector 12 in the enclosure 46 during operation to project the imagery 44.

In an embodiment, the projected media frames may not overlap with one another. Instead, consecutive media frames may be contiguous with one another to project the imagery 44 onto the projection surfaces. For example, in an enclosure 46 with four walls 47, a different media frame may be projection mapped onto each wall in a single rotation cycle of the mirror 26. In an additional or an alternative embodiment, consecutively projected media frames may overlap with one another. In addition, a media frame 62 may cover multiple walls 47. For example, as shown in FIG. 4, the media frame 62 may be projected onto an interface 65 (e.g., a corner) between two walls 47. In another example, the media frame 62 may be projected onto a portion of a single wall 47. Generally, the number of angular degrees of the interior 49 within the enclosure 46 covered by the media frame 62 may be determined via the following equation 1:

$$\text{degrees covered by a media frame} = \frac{\text{rotational speed}}{\text{frame rate}} * 360° \quad (1)$$

in which the rotational speed is rotational cycles per second made by the mirror 26 and frame rate is number of media frames 62 per second output by the projector 12. For example, if frame rate of the projector 12 is 120 frames/second and rotational speed of the mirror 26 is 10 rotations/second, one media frame 62 covers 30 degrees. Generally, the rotation speed of the rotation assembly may be 10-50 rotations per minute (rpm), 50-100 rpm, and/or over 100 rpm. The frame rate of the projector may likewise be 100-150 frames per second (fps), 150-200 frames per second, or over 200 frames per second.

In an embodiment, the media controller 28 may transmit image data to the projector 12 to cause the imagery 44 output by the projector 12 to have a desirable appearance. For example, the media controller 28 may minimize distortion of the imagery 44 projected onto various projection surfaces. To this end, the media controller 28 may determine a parameter, such as a contour, a geometry, a size, a location with respect to the projector assembly 11, and so forth, of the projection surface and transmit image data to the projector 12 based on the parameter. The media controller 28 may determine the parameter based on data received from the one or more sensors 36. For instance, the data may be received in the form of distance measurements (e.g., captured via LIDAR) and/or an images (e.g., captured via a camera). In this manner, the imagery 44 projection mapped onto the projection surface may appear more realistic to provide a more realistic virtual environment for the guests 15.

By way of example, first imagery 44A output by the projector 12 may span an area between a first wall 47A and a second wall 47B at the interface 65. That is, a first portion of the first imagery 44A may be projection mapped onto the first wall 47A, and a second portion of the first imagery 44A may be projection mapped onto the second wall 47B. Based on data associated with the first wall 47A and/or the second wall 47B, the media controller 28 may transmit image data to cause the first portion of the first imagery 44A to appear undistorted on the first wall 47A and the second portion of the first imagery 44A to appear undistorted on the second wall 47B. For instance, the first imagery 44A may appear continuous along and undistorted by the interface 65.

The media controller 28 may similarly cause imagery 44 to appear as desired on other projections surfaces, such as a first interactive object 38A of the one or more interactive objects 38 having a cylindrical shape. As an example, the media controller 28 may determine the shape and/or position of the first interactive object 38A of the one or more interactive objects 38 (e.g., with respect to the first wall 47A) based on the data received from the one or more sensors 36 and transmit image data to the projector 12 to projection map second imagery 44B onto the first interactive object 38A of the one or more interactive objects 38 and reduce distortion of the second imagery 44B based on its cylindrical shape. Thus, the second imagery 44B may appear more realistic on the first interactive object 38A of the one or more interactive objects 38 and unaffected by the cylindrical shape of the first interactive object 38A of the one or more interactive objects 38. The media controller 28 may also cause other imagery 44 to appear as desired (e.g., with reduced distortion) on the guests 15 or any other suitable projection surface. Furthermore, the media controller 28 may dynamically determine adjustments (e.g., a change in position, a change in contour) associated with the projection surfaces and update image data being transmitted to the projector 12 to cause the imagery 44 projection mapped onto the projection surfaces to appear as desired. Thus, the media controller 28 may continually update the appearance of the imagery 44 on the projection surfaces to provide a desirable virtual environment.

In addition, the media controller 28 may transmit image data to the projector 12 to selectively projection map imagery 44 onto certain projection surfaces (e.g., to appear on some projection surfaces and not others). For example, the media controller 28 may determine positioning of a second interactive object 38B of the one or more interactive objects 38 with respect to the second wall 47B. In response, the media controller 28 may transmit image data to the projector 12 to cause the projector 12 to projection map third imagery 44C onto the second wall 47B and avoid projection mapping the third imagery 44C onto the second interactive object 38B of the one or more interactive objects 38. For instance, the second interactive object 38B may appear to be positioned in front of the third imagery 44C and therefore covering a portion of the third imagery 44C. As such, the imagery 44 output by the projector 12 may accommodate the positioning of the one or more interactive objects 38 and various other objects to provide a more realistic appearance of the virtual environment.

Figure 5:
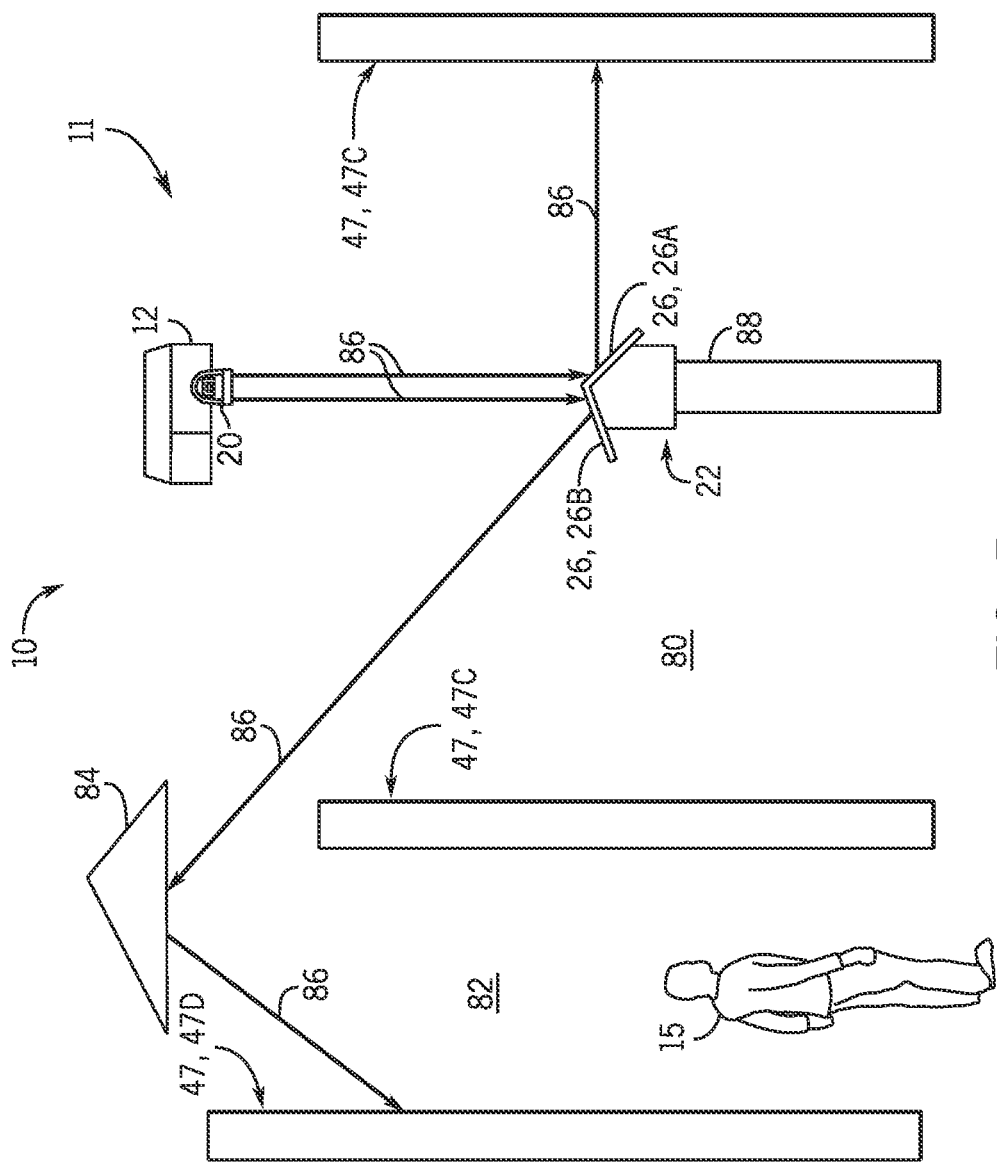
FIG. 5 is a side view of an attraction system having a projector assembly configured to projection map imagery onto a projection surface of the attraction system, in accordance with an aspect of the present disclosure.

In an embodiment, the rotating assembly may include more than one mirror that deflects imagery from the projector. For example, the rotating assembly may include two mirrors as shown in FIG. 5. FIG. 5 is a side view of an embodiment of the attraction system 10 having a first room 80 and a second room 82 (e.g., a separate room, a part of the room 80 that is separated by a wall) of the attraction system 10 where the rotating assembly 22 has at least two mirrors 26, in accordance with an aspect of the present disclosure. As shown, the mirrors 26 of the rotating assembly 22 may deflect imagery in different directions. For example, at a moment in time, one mirror 26A may deflect the imagery directly onto the one or more third walls 47C of the first room 80. A guest positioned in the first room 80 may be able to view the imagery projection mapped onto the one or more third walls 47C.

At the same moment in time, another mirror 26B may deflect the imagery onto one or more fourth walls 47D of a second room 82 via an intervening mirror 84. For example, the other mirror 26B may deflect the imagery onto the intervening mirror 84, and the intervening mirror 84 may subsequently deflect the imagery onto the one or more fourth walls 47D. Accordingly, a guest 15 standing in the second room 82 may view the imagery that is projection mapped onto the one or more fourth walls 47D. The first room 80 and the second room 82 may be separated from one another via a subset of the one or more third walls 47C. For instance, the projector assembly 11 may be concealed from view by the guest 15 positioned in the second room 82. Thus, the imagery projected onto the one or more fourth walls 47D may appear to be more surprisingly or mysteriously provided for the guest 15. Indeed, the intervening mirror 84 may be used to deflect the imagery in any suitable manner to enable projection mapping of the imagery onto a surface (e.g., a wall, another intervening mirror) that the mirrors 26 may not be able to directly projection map the imagery thereto. Additionally, or alternatively, the intervening mirror 84 may deflect the imagery to any blind spots (e.g., walls or other surfaces without a direct line of sight from the mirrors 26 of the rotating assembly 22) of the first room 80.

It should be appreciated that more than one intervening mirror 84 may be used to direct the imagery onto a target wall 47. For example, after being deflected off the mirrors 26 of the rotating assembly 22, the imagery may be deflected off a series of intervening mirrors 84 in sequence (e.g., from a first intervening mirror to a second intervening mirror). Additionally or alternatively, several intervening mirrors 84 may be positioned such that, as the mirrors 26 rotate, the mirrors 26 may deflect the imagery off a different one of the intervening mirrors 84. That is, for example, a first intervening mirror 84A and a second intervening mirror 84B may be positioned adjacent to one another. A first orientation of one of the mirrors 26A may cause the mirror 26A to deflect the imagery onto the first intervening mirror 84 (e.g., for projection mapping onto a first portion of the one or more fourth walls 47D). Rotation of the mirror 26A to a second orientation may cause the mirror 26A to deflect the imagery onto the second intervening mirror 84B (e.g., for projection mapping onto a second portion of the one or more fourth walls 47D). As such, the intervening mirrors 84 and the rotation of the mirrors 26 may cooperatively enable adjusted projection mapping of the imagery.

In the illustrated embodiment, the intervening mirror 84 is attached to a ceiling (e.g., the ceiling 51 of FIG. 1 to which the projector assembly 11 may be attached). However, the intervening mirror 84 may additionally or alternatively be fixed to a different surface, such as a wall 47 or a floor of either of the rooms 80, 82. In addition, the intervening mirrors 84 may be rotated and translated (e.g., vertically or horizontally) to adjust the deflection of imagery, such as the position of the deflected imagery projection mapped on a wall 47. In the illustrated embodiment, the rotating assembly 22 is secured to, such as rotatably coupled to, a support structure 88 that enables the mirrors 26 to rotate about the support structure 88 to adjust the projection mapping of imagery onto different surfaces. In an additional or alternative embodiment, the mirrors 26 of the rotating assembly 22 may be fixedly coupled to the support structure 88 and therefore may not rotate about the support structure 88.

In an embodiment, the projector 12 may project a single unitary imagery toward the mirrors 26, such as in a direction shown by arrows 86 in FIG. 5. It should be appreciated that different portions of the imagery may be separately deflected off each mirror 26 of the rotating assembly 22. For instance, a first portion of the imagery may deflect off one of the mirrors 26A, while a second portion of the imagery may concurrently deflect off another one of the mirrors 26B. In this manner, different portions of the imagery may be projected onto different surfaces, such as different walls 47 located in different rooms 80, 82. For example, the two portions of the imagery may present different scenes in which one scene may be viewed in the first room 80 and another scene may be viewed in the second room 82. In an additional or alternative embodiment, the projector 12 may project separate imagery toward the mirrors 26, such as a respective imagery for each mirror 26 for projection mapping onto different surfaces.

Each of FIGS. 6 and 7 described below illustrates a respective process associated with operation of a projector assembly (e.g., the projector assembly 11 of FIGS. 1-4). In an embodiment, each of the processes may be performed by a single respective component or system, such as by the media controller 28 (e.g., the processor 30) of FIGS. 1-4. In an additional or alternative embodiment, multiple components or systems may perform the operations for a single one of the processes. It should also be noted that additional operations may be performed with respect to the described processes. Moreover, certain operations of the depicted processes may be removed, modified, and/or performed in a different order. Further still, the operations of any of the respective processes may be performed in parallel with one another, such as at the same time and/or in response to one another.

Figure 6:
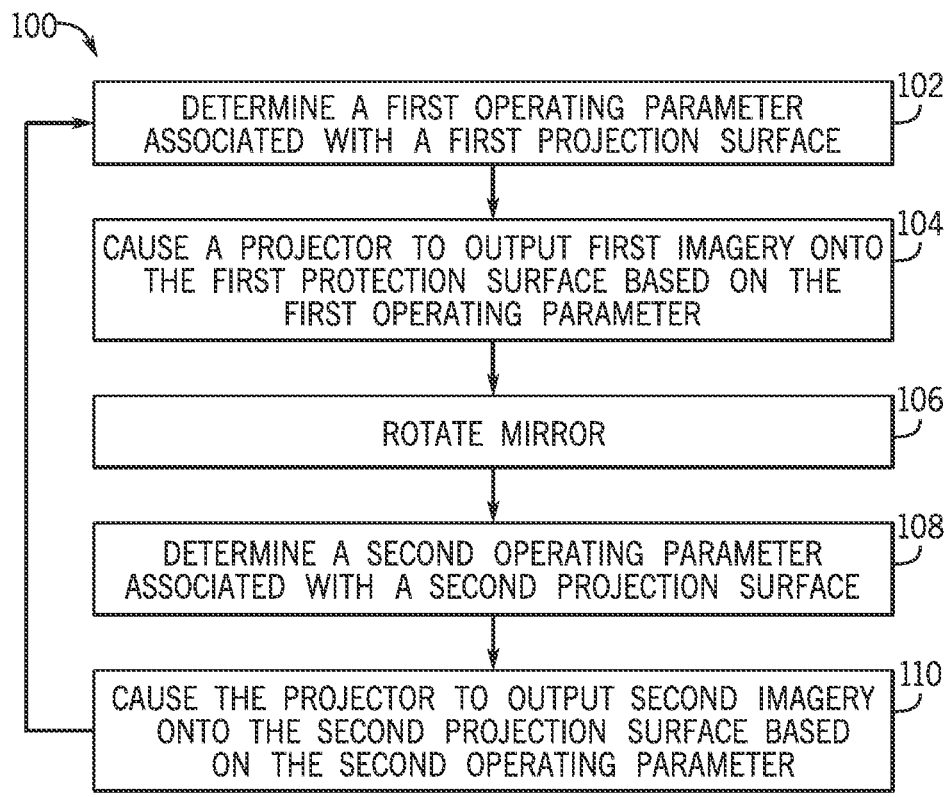
FIG. 6 is a flow diagram of a process for operating a projector assembly to projection map imagery onto projection surfaces of an attraction system, in accordance with an aspect of the present disclosure.

FIG. 6 is a flow diagram of a process 100 for operating a projector assembly to projection map images onto projection surfaces to provide a virtual environment, in accordance with an aspect of the present disclosure. At a block 102, a first operating parameter associated with a first projection surface is determined. The operating parameter associated with the first projection surface may be used in determining the content (e.g., the images shown and the mapping applied) of the imagery projection mapped onto the first projection surface. Accordingly, the operating parameter may include characteristics of the first projection surface, the configuration of the rotating assembly (e.g., when the rotating assembly is "facing" the first projection surface), and guest activity (e.g., information about the interactions of the guests with the interactive objects) that may affect the imagery projected onto the first projection surface. The operating parameter may include an orientation of the rotating assembly (e.g., an angle between the mirror and a reference axis, an amount of a rotational cycle completed, rotational position) associated with the first projection surface. Additionally, or alternatively, the operating parameter may include sensor data. For example, the operating parameter indicated by the sensor data may include a characteristic, such as contour, a geometry, a size, a location (e.g., a distance between the first projection surface and the projector assembly), an orientation, a position, a movement, and so forth of the first projection surface. In addition, the operating parameter may be indicated with a signal from one or more interactive objects 38. In particular, the signal transmitted by the one or more interactive objects 38 may indicate an interaction associated with a guest (e.g., an interaction between the guest and one or more interactive objects 38). For example, the signal may indicate that a guest performed a gesture using the one or more interactive objects 38.

At a block 104, a projector of the projector assembly may be operated to projection map first imagery onto the first projection surface based on the first operating parameter. For example, the first operating parameter may indicate that the mirror is facing a first wall. In response, first target imagery associated with the first wall may be projection mapped. In another example, in response to a determination that the first operating parameter indicates a user interaction (e.g., a user input), the first imagery may include imagery that responds to the user interaction. In either case, first image data may be generated based on the first operating parameter, the first image data may be transmitted to the projector, and the projector may output the first imagery via the first image data. The first imagery output by the projector may deflect off a mirror and toward the first projection surface.

At a block 106, the mirror may be rotated. For example, an actuator may be operated to rotate the mirror about a rotational axis. Rotation of the mirror may adjust the location onto which imagery output by the projector may be projected. For instance, rotation of the mirror may cause the imagery output by the projector to be deflected toward a second projection surface instead of onto the first projection surface.

For this reason, at a block 108, a second operating parameter associated with the second projection surface may be determined, such as using the techniques described above. At a block 110, the projector may be operated to output second imagery onto the second projection surface based on the second operating parameter. For example, the operating parameter may indicate that different imagery is to be output (e.g., second target imagery associated with a second wall may be output, imagery that responds to an additional user interaction may be output). Indeed, second image data, which may be different than the first image data, may be generated based on the second operating parameter, the second image data may be transmitted to the projector, and the projector may output the second imagery via the second image data.

The process 100 may be repeated for other projection surfaces. For example, the mirror may be continually rotated to deflect imagery to additional projection surfaces, and respective operating parameters associated with each projection surface may be determined. The projector may then be operated to output imagery based on such operating parameters. Thus, certain imagery may be projection mapped onto each projection surface (e.g., projection surfaces surrounding an enclosure) to provide a desirable virtual environment.

Figure 7:
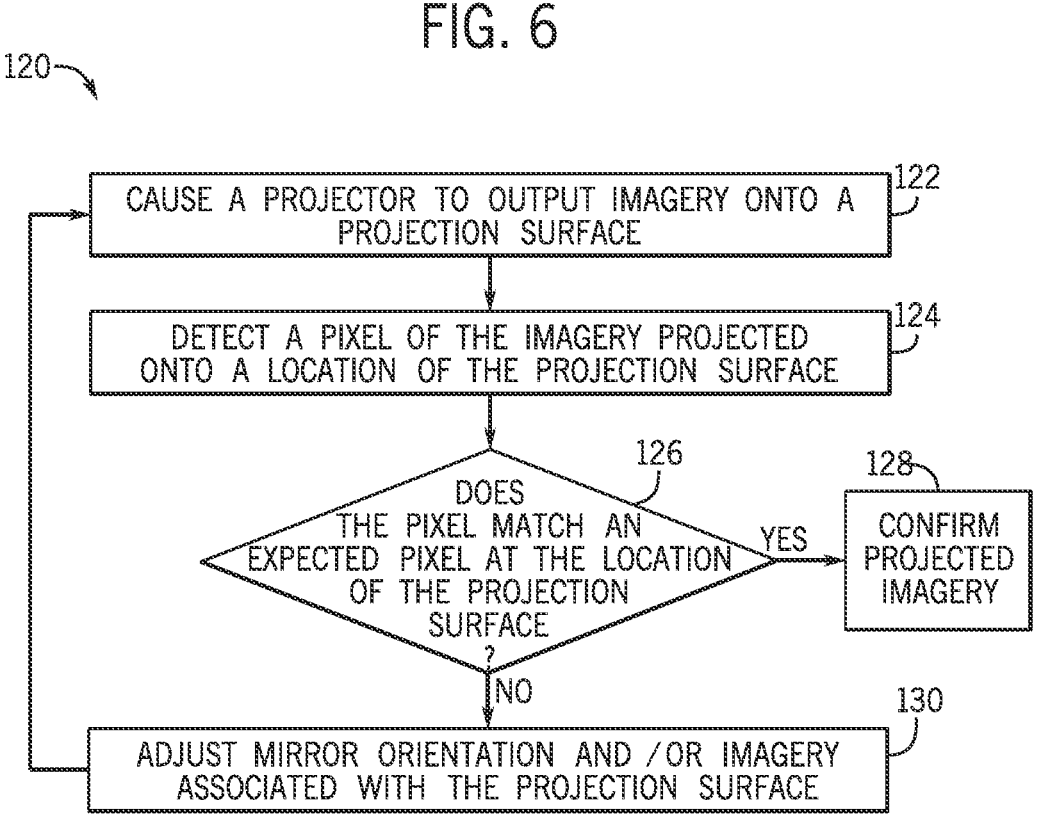
FIG. 7 is a flow diagram of a process for operating a projector assembly to calibrate an alignment between projection mapped imagery and a projection surface of an attraction system, in accordance with an aspect of the present disclosure.

FIG. 7 is a flow diagram of a process 120 for operating a projector assembly to calibrate an alignment between output imagery and a projection surface, in accordance with an aspect of the present disclosure. The calibration may be performed to ensure the imagery is being output to have a desired appearance on the projection surface. In an embodiment, the calibration may be performed prior to operation of the projector assembly to entertain guests (e.g., while operation of a remainder of an attraction system is suspended). In an additional or alternative embodiment, the calibration may be performed during operation of the projector assembly to entertain guests (e.g., while the attraction system is in operation). In either embodiment, operation of the projector assembly may be adjusted to achieve proper alignment to output imagery having the desired appearance.

At block 122, a projector is operated to output imagery onto a projection surface, such as using any of the techniques described above (e.g., based on an operating parameter associated with the projection surface). The imagery may be defined by multiple pixels arrayed to collectively form the imagery. Accordingly, different portions of the projection surface may receive the pixels of the imagery. In an embodiment, the pixel may include a smallest portion of the imagery projected by the projector that may have a uniform property such as color, brightness etc. In an embodiment, the pixel may include a portion of the imagery with a distinct property that may be detected by a sensor.

At a block 124, a pixel of the imagery output onto a location of the projection surface is detected. For example, a light sensor may be positioned at the location of the projection surface. The light sensor may transmit data indicative of a property of the pixel, such as a hue, tint, tone, shade, chroma, saturation, brightness, intensity, and so forth associated with the pixel.

In block 126, a determination is made regarding whether the pixel output onto the location of the projection surface matches an expected pixel (e.g., a target pixel). For example, the expected pixel at the location of the projection surface may have an expected property (e.g., a red hue). The property of the desired pixel output onto the location of the projection surface may be compared to the expected property to determine whether the pixel and the expected pixel match one another.

In response to a determination that the pixel at the location of the projection surface matches the expected pixel, the projected imagery may be confirmed, as shown in block 128. A match between the pixel and the expected pixel may indicate that the alignment between the output imagery and the projection surface is desired and that the imagery therefore appears as desired. As such, the output imagery may be maintained at the location of the projection surface. For example, the image data being generated and transmitted to cause the projector to output the imagery at the location of the projection surface may be maintained and/or the rotation (e.g., a rotational speed) of the mirror may be maintained.

However, in response to a determination that the pixel at the location of the projection surface does not match the expected pixel, then the mirror orientation and/or the imagery associated with the projection surface may be adjusted, as shown in block 130. For example, a determination may be made that the pixel at the location of the projection surface does not match the expected pixel in response to a determination that a difference between an expected property of the expected pixel and a property of the detected pixel exceeds a threshold value. Adjusting the mirror orientation may include adjusting an angle of the mirror (e.g., with respect to a vertical axis), adjusting a rotational speed of the mirror, and/or translating the mirror. Adjusting the imagery may include generating different image data for transmission to the projector. Adjusting the mirror orientation and/or the imagery may adjust a pixel output onto the location of the projection surface toward the expected pixel to adjust the alignment between the output imagery and the projection surface toward a desirable alignment such that the output imagery may appear as desired.

The process 120 may be performed for multiple pixels to verify that the alignment between the output imagery and the projection surface is desirable. For example, multiple pixels of the same imagery may be compared with respective, corresponding expected pixels, and in response to determining that any one of such pixels do not match with its corresponding expected pixel, the mirror orientation and/or imagery may be adjusted. Moreover, the process 120 may be performed multiple times to verify whether the alignment between the output imagery and the projection surface is desirable. By way of example, after the mirror orientation and/or the imagery has been adjusted, the pixel may be detected again to determine whether the alignment between the output imagery and the projection surface is desirable after the adjustment. Thus, the mirror orientation and/or the imagery may be continually adjusted until the alignment is desirable.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system, comprising:
a projector assembly comprising a projector configured to project imagery; and
a rotating assembly comprising a mirror, wherein the rotating assembly is positioned with respect to the projector such that the imagery projected by the projector deflects off the mirror outwardly from an interior of an enclosure and onto a projection surface, and the rotating assembly is configured to rotate the mirror to adjust a positioning of the imagery deflected onto the projection surface via the mirror; and
a light sensor positioned on the projection surface, wherein the projector assembly is configured to:
determine an output of a pixel of the imagery at a location of the projection surface based on data from the light sensor, wherein the output comprises at least one pixel property; and
determine if the output corresponds to an expected output corresponding to a target pixel.

2. The attraction system of claim 1, comprising:
one or more sensors configured to determine an operating parameter associated with the projection surface; and
a media controller communicatively coupled to the one or more sensors and to the projector, wherein the media controller is configured to:
receive, from the one or more sensors, data indicative of the operating parameter; and
based on the operating parameter, transmit image data to the projector to cause the projector to project the imagery to deflect off the mirror and onto the projection surface.

3. The attraction system of claim 2, wherein the operating parameter comprises a contour of the projection surface, a geometry of the projection surface, a size of the projection surface, a location of the projection surface with respect to the rotating assembly, an orientation of the projection surface, a position of the projection surface, or a movement of the projection surface.

4. The attraction system of claim 2, wherein the media controller is configured to:
determine a position of an object with respect to the projection surface; and
transmit, based on the position of the object, the image data to the projector to cause the projector to project the imagery to deflect off the mirror and onto the object.

5. The attraction system of claim 2, wherein the media controller is configured to:
determine a position of an object with respect to the projection surface; and
transmit, based on the position of the object in a projection path, the image data to the projector such that the imagery projected by the projector deflects off the mirror and onto the projection surface and deflection of the imagery off the mirror and onto the object is avoided.

6. The attraction system of claim 1, wherein the mirror is configured to deflect the imagery onto the projection surface via an at least one intervening mirror of the attraction system.

7. The attraction system of claim 1, comprising a media controller communicatively coupled to the projector, wherein the media controller is configured to:
receive an indication of a rotational position of the mirror; and
transmit, based on the rotational position of the mirror, image data to the projector to cause the projector to project the imagery to deflect off the mirror and onto the projection surface.

8. The attraction system of claim 1, wherein the enclosure comprises one or more walls defining an interior of the enclosure, wherein a wall of the one or more walls comprises the projection surface.

9. The attraction system of claim 8, wherein the projector and the rotating assembly are disposed within the interior of the enclosure, the rotating assembly is positioned with respect to the projector to cause deflection of the imagery off the mirror and outwardly from the interior of the enclosure onto the one or more walls, and the rotating assembly is configured to rotate the mirror at a threshold rotational speed to cause the imagery projected by the projector to cover the one or more walls.

10. The attraction system of claim 1, wherein the rotating assembly comprises an actuator configured to rotate the mirror.

11. An attraction system, comprising:
a projector configured to project imagery;
a rotating assembly comprising a mirror, wherein the mirror is configured to receive the imagery projected by the projector and to deflect the imagery onto a surface, and the rotating assembly is configured to rotate the mirror to adjust deflection of the imagery off the mirror and onto the surface;
a light sensor positioned on the projection surface; and
a media controller communicatively coupled to the projector and to the rotating assembly, wherein the media controller is configured to:
perform a calibration of the rotating assembly, wherein the calibration comprises:
detecting, via the light sensor, a pixel of the projected imagery on a location of the projection surface; and
determining if output of the pixel on the location of the projection surface corresponds to at least one property of a target pixel;
determine an operating parameter associated with the surface; and
cause the projector to project imagery onto the surface based on the operating parameter.

12. The attraction system of claim 11, wherein the media controller is configured to cause the rotating assembly to rotate the mirror.

13. The attraction system of claim 11, comprising one or more sensors communicatively coupled to the media controller, wherein the one or more sensors is configured to transmit data indicative of the operating parameter to the media controller, wherein the operating parameter comprises a contour of the projection surface, a geometry of the projection surface, a size of the projection surface, a location of the projection surface with respect to the rotating assembly, an orientation of the projection surface, a position of the projection surface, or a movement of the projection surface.

14. The attraction system of claim 11, wherein the mirror is configured to deflect a first portion of the imagery onto the surface, the rotating assembly comprises an at least one additional mirror, and the at least one additional mirror is configured to receive an at least second portion of the imagery projected by the projector and to deflect the second portion of the imagery onto a second surface.

15. The attraction system of claim 11, wherein the projector is configured to project the imagery along an axis, and the mirror is oriented obliquely with respect to the axis, and wherein the rotating assembly is configured to rotate the mirror about the axis.

16. A non-transitory computer-readable medium comprising instructions that, when executed by processing circuitry, are configured to cause the processing circuitry to perform operations comprising:
determining an operating parameter associated with a wall of an amusement park system, wherein the operating parameter indicates a characteristic of the wall, a depth of the wall, a configuration of a rotating assembly, guest activity, or any combination thereof;
generating image data based on the operating parameter;
transmitting the image data to a projector of the amusement park system to cause the projector to output imagery via the image data onto a mirror for deflection off the mirror and onto the wall;
performing a calibration of the rotating assembly, wherein the calibration comprises detecting, via a light sensor, a pixel of imagery on a location of the projection surface and determining if output of the pixel on the location of the projection surface corresponds to at least one property of a target pixel; and
instructing rotation of the mirror to adjust the deflection of the imagery off the mirror and onto the wall based on the output of the pixel not corresponding to the at least one property of the target pixel.

17. The non-transitory computer-readable medium of claim 16, wherein rotating the mirror causes the mirror to deflect the imagery onto an additional wall of the amusement park system, and the instructions, when executed by the processing circuitry, are configured to cause the processing circuitry to perform operations comprising:
determining an additional operating parameter associated with the additional wall of the amusement park system, wherein the additional operating parameter indicates a characteristic of the additional wall, the configuration of the rotating assembly, the guest activity, or any combination thereof;
generating additional image data based on the additional operating parameter; and
transmitting the additional image data to the projector to cause the projector to output additional imagery via the additional image data onto the mirror for deflection off the mirror and onto the additional wall.

18. The non-transitory computer-readable medium of claim 16, wherein the instructions, when executed by the processing circuitry, are configured to cause the processing circuitry to perform operations comprising:
determining that the pixel and the target pixel do not match one another; and
instructing adjustment of an orientation of the mirror and/or the image data transmitted to the projector in response to determining that the pixel and the target pixel do not match one another.

19. The non-transitory computer-readable medium of claim 18, wherein the instructions, when executed by the processing circuitry, are configured to cause the processing circuitry to perform operations comprising:
comparing a first property of the pixel with a second property of the target pixel; and
determining that the pixel and the target pixel do not match one another based on a difference between the first property of the pixel and the second property of the target pixel exceeding a threshold value.

20. The attraction system of claim 2, wherein the media controller is configured to:
receive, from the one or more sensors, data indicative of a user interaction; and
cause the imagery to respond to the user interaction.

* * * * *